Oct. 17, 1967    A. L. LOCKHART    3,347,343
DEVICE FOR PREVENTING ENGAGEMENT OF VEHICLE
BUMPER WITH GARAGE WALL
Filed Oct. 27, 1966
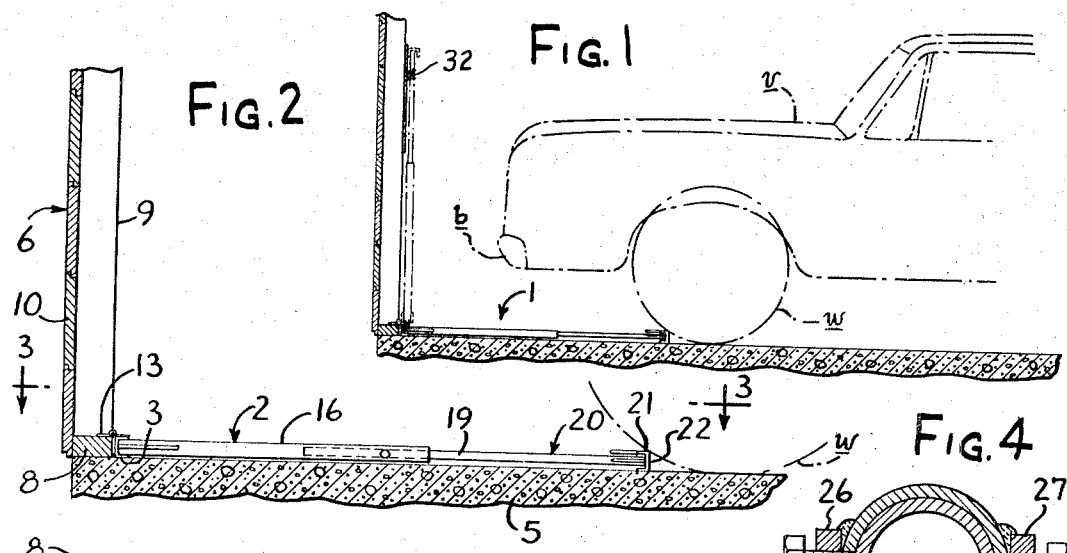
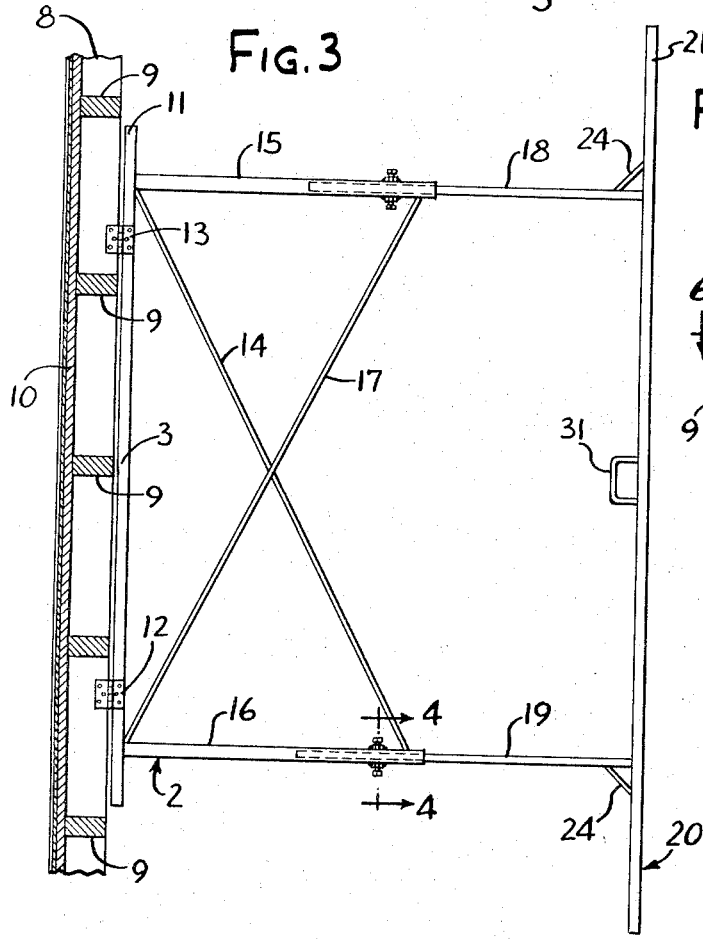
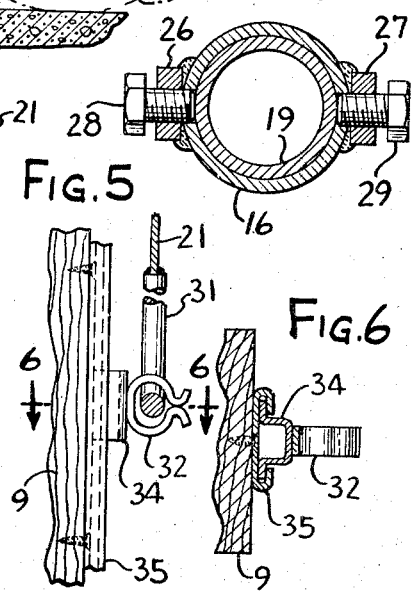
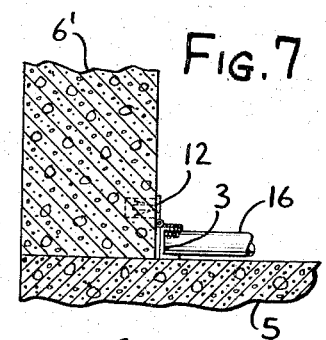
INVENTOR
ALFRED L. LOCKHART
by: Spector & Alster
ATTYS.

United States Patent Office 3,347,343
Patented Oct. 17, 1967

3,347,343
DEVICE FOR PREVENTING ENGAGEMENT OF VEHICLE BUMPER WITH GARAGE WALL
Alfred L. Lockhart, 4321 N. Melvina Ave., Chicago, Ill. 60634
Filed Oct. 27, 1966, Ser. No. 590,041
7 Claims. (Cl. 188—32)

ABSTRACT OF THE DISCLOSURE

A device for preventing engagement of a vehicle bumper with a garage wall comprises a frame adjacent to the junction of the garage floor and wall. The frame has telescoping sections permitting the distance that the frame projects from the garage wall to be adjusted so that when the car wheel abuts the frame the car bumper will be short of the garage wall. The frame is hinge-mounted so that it may be swung up from the floor and secured in a storage position along the garage wall.

---

This invention relates to a device for preventing the engagement of a vehicle bumper with a garage wall.

It is an object of the present invention to provide a device that may be installed in a garage in such position that it may be engaged by one or more wheels of an automobile that is driven into the garage to prevent the vehicle bumper from bumping the garage wall and thereby possibly causing damage to the wall or to the vehicle.

It is a further object of the present invention to provide a device of the type stated having an abutment member for engagement by the vehicle wheel or wheels and in which the position of the abutment member relative to the garage wall may be adjusted. The device is particularly useful for home-owners and other users of small private garages wherein the same vehicle or vehicles are customarily parked in the same place. Thus, the abutment member may be positioned so that one end of the vehicle is clear of the garage door and yet the bumper at the other end of the vehicle does not bump against the garage wall. The adjustability of the abutment member also permits its position to be changed to accommodate cars of different lengths and wheelbases, and bumper overhang. Likewise, the position of the abutment may be set so that the car does not invade a desired clearance space at the back of the garage, which may be storage or a work area.

It is also an object of the present invention to provide a device of the type stated which can be attached to either the garage plate, in the case of a frame or brick veneer structure, or to the wall of the garage in the case of an all masonry structure.

It is another object of the present invention to provide a device of the type stated which normally rests on the floor of the garage but which can be swung upwardly to a storage position when it is desired to clean or otherwise use the area occupied by the device.

The attainment of the above and further objects of the present will be apparent from the following description taken in conjunction with the accompanying drawing forming a part thereof.

In the drawing:

FIG. 1 is a fragmentary side elevational view of a device constructed in accordance with and embodying the present invention;

FIG. 2 is an enlargement of a portion of FIG. 1;

FIG. 3 is fragmentary sectional view taken along line 3—3 of FIG. 2;

FIG. 4 is a fragmentary sectional view taken along line 4—4 of FIG. 3;

FIG. 5 is a fragmentary elevational view on an enlarged scale, partially in section, of another portion of FIG. 1 and showing the device in its stored position;

FIG. 6 is a fragmentary sectional view taken along line 6—6 of FIG. 5; and

FIG. 7 is a fragmentary sectional view of a modified form of the invention.

Referring now in more detail and by reference characters to the drawing, 1 designates generally a device of the present invention. The device 1 comprises a first frame 2 having an elongated, horizontal channel shaped end portion 3. The end portion 3 is adjacent to the concrete garage floor 5 and the garage wall 6 which is opposite to the garage door (not shown). In the form of the invention shown in FIGS. 1-3, the garage wall 6 is of frame construction and includes a garage plate 8 that is anchored to the floor 5, upstanding spaced apart studs 9 and siding 10. The studs 9 and garage plate 6 may be so called "two-by-fours." Secured to one of the flanges 11 of the end portion 3 are hinges 12, 13 which are also secured to the garage plate 6. These hinges form a horizontal hinge axis that is parallel to the garage plate 8.

Welded or otherwise rigidly secured to the bight of the end portion 3 and extending perpendicular thereto are spaced parallel tubes 15, 16. Suitable cross braces 14, 17 may be rigidly connected to the tubes 15, 16. These tubes 15, 16 telescopically receive tubes 18, 19 that form part of a second frame 20. The second frame 20 has a channel shaped member 21 that is similar to the end number 3 and is parallel thereto and to which the tubes 18, 19 are welded at the bight portion 22. Suitable braces 24 may also be provided on the second frame 20 for rigidifying the tubes 18, 19. The member 21 rests on the floor 5 and constitutes an abutment for engagement with the front or back pair of wheels w of the vehicle v to prevent the overhanging vehicle bumper b from engaging the garage wall 6.

The distance of the abutment member 21 from the wall 6 may be adjusted by varying the extent to which the tubes 18, 19 telescope within the tubes 15, 16. To hold the tubes 15, 16, 18, 19 in rigid assembled relationship the tubes 15, 16 are each provided with a pair of threaded bosses 26, 27 which receive set screws 28, 29. The screws may be clamped against the inner tubes 18, 19. The distance from the abutment member 5 to the wall 6 may thus be adjusted so that when the car is driven into the garage and toward the wall 6, the overhanging bumper b will clear the wall 6 when the wheels of the vehicle engage the abutment 21. At the same time the car will be sufficiently within the garage so that the end of the car opposite to the bumper b will permit the garage door to be closed.

While the device 1 may be mounted so that two wheels of the vehicle engage the abutment 21, the device could be mounted so that it may be used by two side-by-side vehicles in the garage. In that case one wheel of each vehicle would engage the abutment 21 and the position of the abutment 21 would usually be adjusted to take care of the longer of the two vehicles.

The device may be swung about the hinge axis to a storage position against the garage wall when it is desired to clean the floor area under the device or otherwise utilize that space. The storage position is shown in broken lines in FIG. 1 and in full lines in FIGS. 5 and 6. To maintain the device in stored position, the abutment 21 may have a handle 31 welded to one flange and engageable with a U-shaped spring clip 32. The jaws of the spring clip 32 may be forced apart by pushing the handle 31 between and past them. To remove the handle 31 from the clip 32 and thus lower the device to the floor the handle 31 may be grasped and pulled away from the clip 32. This spreads the clip jaws to permit the handle to be retracted therefrom. The clip 32 may be secured to a spring slide 34 which frictionally engages a track 35 mounted on one of the studs 9 that is approximately centered between the hinges 12, 13. By pressing together the two sides of the slide 34, the flanges 37, 37 of the slide may be brought out of spring-pressed engagement with the track 35 so that the slide 34 and clip 32 may be moved as a unit to a selected position of adjustment on the track 34. This allows the clip 32 to be located in proper position to receive the handle 31.

Other means may be used for retaining the device in its storage position. For example, a permanent magnet or a hook and chain may be used in lieu of the spring clip 32.

FIGURE 7 shows a modified form of the invention in which the hinges 12, 13 are secured directly to the wall 6' of the garage. This may be done in garages having no garage plate, for instance wherein the wall 6' is of brick or concrete block. The track 35 may likewise be secured directly to the wall 6'.

In compliance with the requirements of the patent statutes, I have herein shown and described a preferred embodiment of the present invention. It should be understood, however, that the invention is not limited to the precise construction herein shown and described, the same being merely illustrative of the present invention.

What is new and desired to be secured by Letters Patent is:

1. A device for preventing the engagement of a vehicle bumper with the wall of a garage and wherein the vehicle bumper overhangs an adjacent wheel of the vehicle, said device comprising a first frame having an elongated end portion for longitudinal disposition adjacent to the garage wall and the garage floor, a second frame having an elongated abutment portion in generally horizontally spaced relationship to said end portion and the garage wall and adjacent to the garage floor for engagement with the vehicle wheel, cooperating frame members securing the end portion and abutment portion together, the distance of said abutment portion from said end portion being an amount sufficient to permit the vehicle wheel to engage said abutment with the vehicle bumper spaced from the garage wall and between the wall and said abutment, and means for hinging the first frame to the garage for swinging about a horizontal axis toward and away from the garage floor to permit the two frames to be swung as a unit from an operative generally horizontal position adjacent to the garage floor to an upwardly projecting storage position along the garage wall, the hinge means being mounted with the hinge axis above the bottom of the adjacent frame to permit said swinging movement of said frames, the elongated abutment portion being secured to the frame members at a location no higher from the floor than is said hinge axis, and means for releasably holding the frames in their storage position.

2. A device according to claim 1 in which the end portion and abutment portion are beams that are parallel to each other.

3. A device according to claim 1 in which the frame members comprise tubes that telescope, and the means for rigidly securing the frame members comprises a fastener on one of the tubes that releasably engages the other tube.

4. A device according to claim 1 further comprising handle means on the second frame by which the unit may be lifted from the operative to the storage position, and means cooperating with the handle means for retaining the unit in said storage position.

5. A device according to claim 1 further comprising interengaging elements on the garage wall and on one of said frames for retaining said frames in the storage position, and means for adjusting the position of one of said elements relative to the garage floor.

6. A device according to claim 1 further comprising interengaging elements on the garage wall the second of said frames for retaining the frames in the storage position, one of said elements being a clasp and the other of said elements being removably engageable by said clasp, and means for adjusting the elevation of the element on the wall to accommodate the position of the other element as determined by the relative adjusted positions of the two frames.

7. A device according to claim 6 in which said cooperating frame members comprise pairs of telescoping tubes, one pair of tubes being spaced from the other pair, and said means for rigidly securing the frame members together comprises a fastener on one tube of each pair that releasably engages the other tube of that pair.

References Cited

UNITED STATES PATENTS

| | | | |
|---|---|---|---|
| 2,441,037 | 5/1948 | Sherrin | 248—291 |
| 2,693,786 | 11/1954 | Babros et al. | 248—240.4 X |
| 3,024,871 | 3/1962 | Stein | 188—32 |

MILTON BUCHLER, *Primary Examiner.*

T. W. BUCKMAN, *Assistant Examiner.*